April 1, 1969    B. T. CRUTCHER III, ET AL    3,435,934
TORQUE AND ACCELERATION CONTROL CLUTCH
Filed April 10, 1967
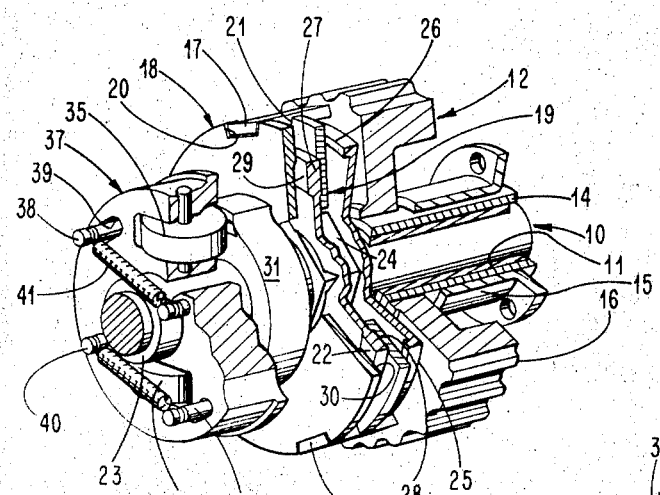
FIG. 1
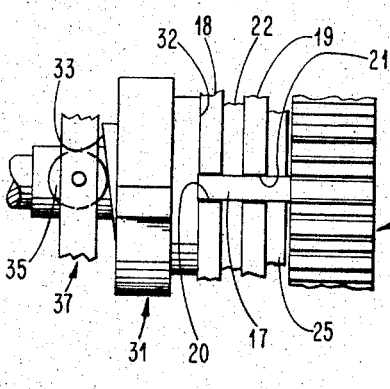
FIG. 2
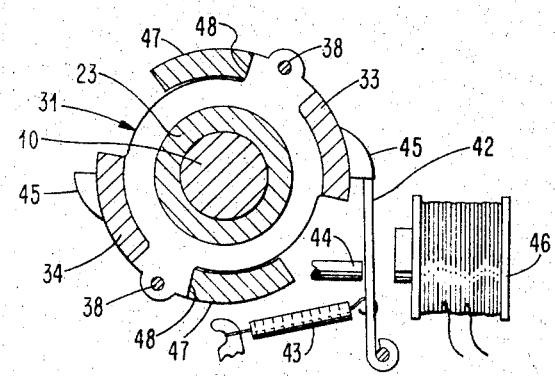
FIG. 3
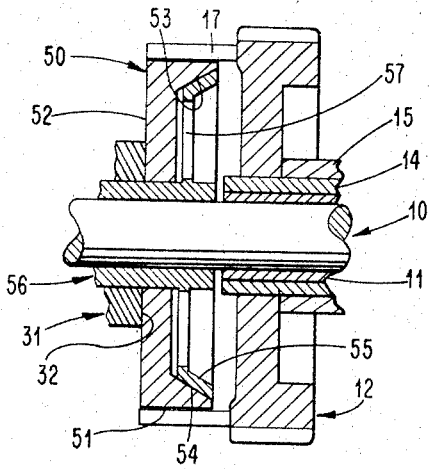
FIG. 4
INVENTORS
B. TODD CRUTCHER III
RONALD D. DODGE
BY
ATTORNEY United States Patent Office 3,435,934
Patented Apr. 1, 1969

3,435,934
TORQUE AND ACCELERATION CONTROL CLUTCH
B. Todd Crutcher III and Ronald D. Dodge, Lexington, Ky., asisgnors to International Business Machines Corporation, Armonk, N.Y., a corporation of New York
Filed Apr. 10, 1967, Ser. No. 629,579
Int. Cl. F16d *19/00, 21/00, 23/00*
U.S. Cl. 192—93                    15 Claims

ABSTRACT OF THE DISCLOSURE

A clutch comprising rotary driving and driven members with the members having cooperating friction members engaging with each other to cause the driving member to drive the driven member. A rotatable member, which is connected to the rotary driven member by springs, has a pair of diametrically disposed inclined surfaces cooperating with rollers on the driven member. When the rotatable member is permitted to rotate by a latching mechanism, the springs cause rotation of the rotatable member relative to the driven member whereby cooperation between the rollers and the inclined surfaces causes axial movement of the rotatable member into engagement with one of the friction members on the rotary driving member. As a result, the friction members are moved into engagement with each other whereby acceleration control of the rotary driven member is obtained.

---

When a driving member is coupled to a driven member by a clutch, the driven member tends to rotate at a greater velocity than the driving member during pick-up of the driven member unless the pick-up of the driven member is controlled through control of the acceleration of the driven member. For example, when a driven member is coupled to a driving member by a dog clutch, the velocity of the driven member may reach a value substantially greater than the velocity of the driving member.

When the connection and disconnection of the clutch mechanism occurs quite frequently, this high velocity of the driven member relative to the velocity of the driving member is particularly undesirable. For example, if the driven member has a cam attached thereto for cooperation with a cam follower, which is designed to cooperate with the cam while the cam is driven at a predetermined velocity such as the velocity of the driving member, then the velocity surge of the driven member to a substantially greater value than the driving member can result in the cam follower not properly following the cam.

Accordingly, the velocity surge of the driven member presents a problem where the load of the driven member depends upon the driven member operating at substantially the same velocity as the driving member. This is particularly applicable when the clutch cycles are relatively short such as, for example, the driven member only rotating 180° during each cycle of clutch engagement before the clutch is disengaged.

The present invention satisfactorily overcomes the foregoing problem of velocity surge by controlling the acceleration of the driven member. By maintaining the acceleration of the driven member relatively low, the velocity surge of the driven member will be controlled to an extent that will result in it operating at substantially the velocity of the driving member.

In prior friction clutches, the clutch is designed so that it tends to slip whenever the driven member exceeds a predetermined load. Thus, the output torque of the friction clutch is limited to a predetermined, designed value. Accordingly, if the load should increase beyond the designed load, the prior friction clutches cannot transmit sufficient torque to handle the increased load.

The present invention satisfactorily overcomes this problem by utilizing a friction clutch in which the torque output may increase to equal the load on the driven shaft. Thus, the clutch of the present invention regulates the output torque in accordance with the load on the driven member.

When starting a driven member, there is usually a shock on the various elements of the clutch. This shock of starting the clutch has resulted in various means being utilized to absorb this shock. For example, resilient means such as springs or rubber cushions have been employed to absorb the shock of starting in dog clutches. However, the energy, which is absorbed by the resilient means, must be fed out. As a result, this absorbed energy tends to make the driven member run at a greater velocity than the driving member.

The present invention eliminates the requirement for any energy absorbing material, which then feeds out the energy. In the present invention, the friction surfaces of the clutch are permitted to slip to waste this energy from the shock of starting while still controlling the acceleration of the driven member.

In prior friction clutches, the wear of the friction engaging surfaces results in the clutch having a relatively short service life. The present invention satisfactorily overcomes this problem by automatically compensating for any wear in the friction engaging surfaces to provide a relatively long service life for the clutch.

An object of this invention is to provide a clutch that controls the acceleration of the driven member during pick-up.

Another object of this invention is to provide a clutch that regulates the output torque in accordance with the load on the driven member.

A further object of this invention is to provide a friction clutch having a relatively long service life.

Still another object of this invention is to provide a clutch that prevents overrun of the driven member.

The foregoing and other objects, features and advantages of this invention will be apparent from the following more particular description of preferred embodiments of the invention, as illustrated in the accompanying drawing.

In the drawing:

FIG. 1 is a perspective view showing one form of the clutch of the present invention with the clutch being engaged.

FIG. 2 is a top plan view of a portion of the clutch of FIG. 1.

FIG. 3 is a side elevational view, partly in section, showing the clutch of FIG. 1 and its latching mechanism with the clutch disengaged.

FIG. 4 is a sectional view, partly in elevation, of a portion of another embodiment of the clutch of the present invention.

Referring to the drawing and particularly FIG. 1, there is shown a shaft 10 having one end supported in a bearing 11. The other end of the shaft 10 also is journaled in a suitable bearing (not shown). The shaft 10, which is driven when the clutch of the present invention is engaged, is connected to a load, which may vary. One example of such a varying load would be a spring biased pivotally mounted member cooperating with a cam on the shaft 10.

A pulley driver 12, which functions as the driving member and may be driven by any suitable means, has a sleeve 14 thereon to rotatably mount the assembly in a bearing 15, which is secured to fixed structure. One means of driving the pulley driver 12 is to provide teeth 16 on the outer periphery of the pulley driver 12 for engagement with serrations on a belt (not shown), which may be driven by suitable motive means such as an electric motor (not shown), for example.

The pulley driver 12 has a plurality of driving lugs 17 extending from one side thereof. The lugs 17 are preferably equally angularly spaced from each other, and there are preferably four of the driving lugs 17.

A pair of disks 18 and 19 is slidably mounted on the pulley driver 12 by having grooves or channels 20 and 21, respectively, to receive the driving lugs 17. With this arrangement, the disks 18 and 19 rotate with the pulley driver 12 but are slidable relative thereto.

A disk 22, which is slidably mounted on a member 23, is adapted to be disposed between the disks 18 and 19. The disk 22 is slidably mounted on the member 23 through having a circular central opening formed with angled grooves or corners, which cooperate with the corners of a polygonal shaped portion 24 of the member 23. The portion 24 is preferably square shaped whereby the central opening in the disk 22 has four angled grooves or corners that are equally angularly spaced from each other. However, the portion 24 may have any other polygonal shape since it is only necessary to mount the disk 22 on the member 23 so that the disk 22 slides relative to the member 23 while rotating therewith.

The member 23, which is fixedly secured to the shaft 10 for rotation therewith, has a portion 25 extending radially outwardly from its hub and disposed between the pulley driver 12 and the disk 19 of the pulley driver 12. Since the member 23 cannot move axially, the portion 25, which is adjacent the disk 19, forms a stop plate whereby the disks 18, 22, and 19 may be moved into driving engagement with each other and with the annular portion 25 to form a friction clutch. As a result, the pulley driver 12 rotates the shaft 10 when there is engagement between the disks 18, 22, and 19 and the annular portion 25.

The annular portion 25 of the member 23 has an outer, annular surface 26, which protrudes from the portion 25 and engages the disk 19 to create frictional engagement therebetween. The disk 22 has an enlarged annular portion 27 on its outer end with a surface 28 engaging the disk 19 and a surface 29 engaging a protruding annular surface 30 on the disk 18.

A sleeve 31 is mounted on the member 23 for rotation relative to the member 23 and axial movement relative to the shaft 10, the member 23, the pulley driver 12, and their related structures. The sleeve 31 has its surface 32 (see FIG. 2) adapted to engage the disk 18 to move the disk 18 toward the pulley driver 12 whereby the disks 18, 19, and 22 are moved into friction engagement with each other and with the annular portion 25 of the member 23 to provide driving engagement between the pulley driver 12 and the shaft 10.

The axial movement of the sleeve 31 is controlled by a pair of diametrically disposed inclined surfaces 33 and 34 cooperating with a pair of diametrically disposed rollers 35 and 36, respectively, which are rotatably mounted on an annular member 37. Thus, the surfaces 33 and 34 and the rollers 35 and 36 form cooperating cam surfaces. The annular member 37 is fixedly secured to the member 23 whereby the member 37 rotates with the driven shaft 10 to form part of the rotary driven member.

A pair of diametrically disposed pins 38 extends from the sleeve 31 in a direction away from the pulley driver 12 and substantially parallel to the longitudinal axis of the shaft 10. Each of the pins 38 extends through an arcuate slot 39 in the annular member 37 to permit rotation of the sleeve 31 relative to the annular member 37.

The annular member 37 has a pair of diametrically disposed pins 40 extending therefrom in a direction away from the sleeve 31. The pins 40 are disposed substantially parallel to the longitudinal axis of the shaft 10 and to the pins 38.

Springs 41 extend between the pins 38 and the pins 40 to resiliently connect the sleeve 31 to the annular member 37. The springs 41 continuously urge the sleeve 31 clockwise as viewed in FIGS. 1 and 3.

As shown in FIG. 3, a latch mechanism is employed to retain the sleeve 31 against rotary movement relative to the shaft 10 and the annular member 37. The latch mechanism includes a pivotally mounted arm 42, which is urged by a spring 43 against a stop 44 so as to be positioned in the path of rotation of a pair of diametrically disposed projections 45 on the sleeve 31. Energization of a solenoid 46 moves the arm 42 against the force of the spring 43 and out of the rotating path of the projections 45 on the sleeve 31. The arm 42, the stop 44, one end of the spring 43, and the solenoid 46 are secured to fixed structure.

Considering the operation of the clutch of the present invention, momentary energization of the solenoid 46 unlatches the arm 42 from one of the projections 45. The springs 41, which continuously urge the sleeve 31 to rotate, cause rotation of the sleeve 31 relative to the annular member 37 as soon as the arm 42 is moved out of the rotary path of the projections 45 by the solenoid 46 being energized.

As the annular member 31 rotates, it is moved axially relative to the annular member 37 and the pulley driver 12 by the inclined surfaces 33 and 34 cooperating with rollers 35 and 36, respectively. This causes the surface 32 of the sleeve 31 to exert an axial force on the disk 18. The exertion of an axial force on the disk 18 moves the disks 18, 22, and 19 axially to create friction engagement between the disks 18, 22, and 19 and the annular portion 25 of the member 23 whereby the pulley driver 12 begins to drive the shaft 10.

The springs 41 exert a turning force on the sleeve 31 to create an axial force on the sleeve 31. The axial force moves the surface 32 of the sleeve 31 into engagement with the rotating disk 18 of the pulley driver 12. This frictional engagement between the surface 32 of the sleeve 31 and the disk 18 has a dynamic coefficient of friction. The product of the dynamic coefficient of friction and the axial force on the sleeve 31 creates a second turning force, which tends to rotate the sleeve 31 further relative to the annular member 37.

As a result, the point of contact between the rollers 35 and 36 advances further up the inclined surfaces 33 and 34, respectively, to increase the axial force on the sleeve 31. When the axial force on the sleeve 31 increases, a greater turning force is exerted on the sleeve 31 because of the increase in the second turning force due to the axial force on the sleeve 31 increasing. This regenerative feature continues until the annular member 37 and the sleeve 31 are rotating at the same speed as the disk 18.

When this occurs, there is no relative rotation between the sleeve 31 and the disk 18 whereby there is no dynamic coefficient of friction. Thus, the second turning force on the sleeve 31 decreases to zero. Accordingly, the annular member 37, the sleeve 31, and the disk 18 rotate at the same speed.

If the load on the driven shaft 10 should increase, this would tend to cause the annular member 37, which is fixed to the driven shaft 10 through the member 23, to slow down relative to the rotating disk 18. As a result, the axial force on the sleeve 31 would be increased because the rollers 35 and 36 would advance further up the inclined surfaces 33 and 34, respectively, of the sleeve 31.

Depending on the force of the springs 41, the sleeve 31 also might slow down relative to the disk 18 when the load on the driven shaft 10 increases. If this were to occur, then a dynamic coefficient of force would again exist between the surface 32 of the sleeve 31 and the disk 18 to produce a further turning force on the sleeve 31 until the dynamic coefficient of friction is again zero due to no relative movement between the sleeve 31 and the disk 18. When this occurs, the driven shaft 10 again is rotated at the same speed as the disk 18 as is the sleeve 31 whereby the clutch of the present invention has now adapted to produce the required output torque for the driven shaft 10.

The value of the axial force between the disk 18 and the disk 22 determines the velocity of the shaft 10 relative to the pulley driver 12 and is directly proportional to the axial force of the sleeve 31 on the disk 18. As previously mentioned, the axial force on the sleeve 31 is due to a combination of (1) the force of the springs 41 and the inclination of the inclined surfaces 33 and 34 (these surfaces have the same inclination), and (2) the dynamic coefficient of friction between the surface 32 of the sleeve 31 and the disk 18.

The inclination of the inclined surfaces 33 and 34 controls the acceleration of the pick-up of the driven shaft 10. Thus, the greater the inclination of the surfaces 33 and 34, the greater the acceleration of the pick-up of the driven shaft 10.

Accordingly, acceleration control of the driven shaft 10 is obtained with the clutch of the present invention. By properly designing the inclination of the surfaces 33 and 34, the velocity surge of the driven shaft 10 is substantially eliminated. While the inclined surfaces 33 and 34 have been shown as straight, it should be understood that they could have a curved configuration, if desired, depending on the desired acceleration of the driven shaft 10 by the pulley driver 12.

In order to insure that the rollers 35 and 36 remain in engagement with the cam surfaces 33 and 34, respectively, the modulus of elasticity or spring rate betweeen the annular member 37 and the member 23 must be properly selected or determined. This spring rate also determines the amount of rotation of the sleeve 31 relative to the annular member 37 before the annular member 37 begins to rotate.

The sizes of the disks 18, 19, and 22, the member 23, and the annular member 37 must be geometrically selected to obtain the desired spring rate between the members 37 and 23, which have the disks 18, 19, and 22 clamped therebetween. This is preferably accomplished by changing only the spring rate of the disk 19 or 22 or the member 23 until the combined desired spring rate is obtained.

For example, the spring rate of the member 23 can be changed by providing holes adjacent the rim of the annular portion 25 whereby the rim of the portion 25 deflects with respect to the hub of the member 23. The spring rate of the disk 19 or 22 could be altered by utilizing staggered bearing surfaces rather than a continuous bearing surface. This would result in more deflection of the disk 19 or 22 to increase the spring rate.

The spring rate between the annular member 37 and the member 23 controls the pick-up time of the rotary driven shaft 10. Thus, if the spring rate is too high, the pick-up of the shaft 10 occurs too quickly whereby velocity surge of the shaft 10 may occur.

When the shaft 10 is being driven by the pulley driver 12 due to the friction clutch being engaged, the varying load on the shaft 10 may attempt to make the shaft run faster than the pulley driver 12. If the load is a spring biased, pivotally mounted arm cooperating with a cam on the driven shaft 10, the spring would feed energy into the shaft 10 during the second half of the clutch cycle. (The entire clutch cycle is 180° of rotation of the shaft 10.) However, the disks 18, 22, and 19 resist this effort of the shaft 10 to rotate faster than the pulley driver 12 because of the frictional engagement therebetween.

As the sleeve 31 completes 180° of rotation, the other of the projections 45 on the sleeve 31 engages the arm 42 of the latching mechanism since the solenoid 46 is only momentarily energized. This stops rotation of the sleeve 31. However, the rollers 35 and 36 continue to move relative to the inclined surfaces 33 and 34 on the sleeve 31 until the disks 18, 22, and 19 and the portion 25 of the member 23 are no longer in friction engagement with each other.

This results in the annular member 37 continuing to advance by momentum until diametrically disposed projections 47 (see FIG. 3) on the annular member 37 engage diametrically disposed stop surfaces 48 on the sleeve 31 at which time the rollers 35 and 36 are disposed on the lowermost portion of the inclined surfaces 33 and 34, respectively. This permits the springs 41 to again be ready to rotate the sleeve 31 relative to the annular member 37 as soon as the arm 42 is removed from its latching position.

Referring to FIG. 4, there is shown another form of the invention in which the friction disks 18, 19, and 22 and the member 23 are no longer used. Instead, the driving lug 17 of the pulley driver 12 slidably supports an annular member 50 for slidable movement thereon. The annular member 50 has grooves or channels 51, which are equal in number to the driving lugs 17, formed therein to receive the driving lugs 17 whereby the annular member 50 may rotate with the pulley driver 12 but is slidable relative thereto in the same manner as the disks 18 and 19.

The annular member 50 has its surface 52 engaged by the surface 32 of the sleeve 31 to cause axial movement of the annular member 50 towards the pulley driver 12 when the sleeve 31 is moved axially toward the pulley driver 12. On the opposite side of the annular member 50 from the surface 52 is an annular, conical surface 53. The conical surface 53 is adapted to cooperate with a similar annular, conical surface 54 on an annular portion 55 of a member 56, which replaces the member 23 of FIGS. 1–3 and is fixedly secured to the shaft 10. The portion 55 is connected to the hub of the member 56 by a plurality of ribs 57. The member 56 carries the annular member 37 fixedly secured thereto in the same manner as the member 23 does.

The cooperation between the inclined surfaces 33 and 34 on the annular sleeve 31 with the rollers 35 and 36, respectively, on the annular member 37 is the same as for the modification of FIGS. 1–3. Accordingly, the inclined surfaces 33 and 34 determine the acceleration rate and the pick-up time. Furthermore, the same slippage may occur between the conical surfaces 53 and 54 as occurs between the disks 18, 19, and 22 and the portion 25 of the member 23 in the modification of FIGS. 1–3.

By utilizing the cooperation of the rollers 35 and 36 wit hthe inclined surfaces 33 and 34, respectively, any wear of the disks 18, 19, and 22 and the annular portion 25 of the member 23 or wear between the conical surfaces 53 and 54 in the modification of FIG. 4 is automatically compensated for by the present invention. Thus, if wear should occur, the rollers 35 and 36 would move further up the inclined surfaces 33 and 34, respectively, during each clutch cycle to compensate for this wear.

An advantage of this invention is that it prevents overrun of the driven member. Another advantage of this invention is that it minimizes the velocity surge of the driven member after pick-up of the driven member. A further advantage of this invention is that it prevents feedout of any absorbed energy by wasting the energy through the friction surfaces. Still another advantage of this invention is that it is self-correcting for any wear in the friction surfaces.

While the invention has been particularly shown and described with reference to preferred embodiments thereof, it will be understood by those skilled in the art that the foregoing and other changes in form and details may be made therein without departing from the spirit and scope of the invention.

What is claimed is:
1. A clutch comprising:
a rotary driving member;
a rotary driven member;
means to couple said rotary driving member to said rotary driven member to cause said rotary driving member to rotate said rotary driven member;
a rotatable member, separate from said coupling means, mounted for axial movement relative to said driving and driven members to cause said coupling means to become operative;
means attached to said rotatable member and to said rotary driven member to urge said rotatable member to rotate relative to said rotary driven member;
and said rotary driven member and said rotatable member having cooperating means to control the axial movement of said rotatable member whereby the activation of said coupling means is controlled.

2. The clutch according to claim 1 in which said attached means continuously urges said rotatable member to rotate.

3. The clutch according to claim 1 in which said attached means comprises a pair of diametrically disposed springs.

4. The clutch according to claim 1 in which said cooperating means has means to compensate for wear of said coupling means.

5. A friction clutch comprising:
a rotary driving member;
a rotary driven member;
a rotatable member mounted for axial movement relative to said driving and driven members;
said rotary driving member and said rotary driven member having cooperating surfaces adapted to frictionally engage each other to cause said rotary driving member to rotate said rotary driven member;
means urging said rotatable member to rotate;
and said rotary driven member and said rotatable member having cooperating cam surfaces to move said rotatable member axially relative to said driving and driven members when said rotatable member is rotated by said urging means to cause engagement of said cooperating surfaces on said driving and driven members to rotate said rotary driven member.

6. The clutch according to claim 5 in which said urging means continuously urges said rotatable member to rotate.

7. The clutch according to claim 6 in which said urging means is attached to said rotatable member and said rotary driven member.

8. The clutch according to claim 7 in which said urging means comprises a pair of diametrically disposed springs.

9. The clutch according to claim 5 in which said cam surfaces comprise:
a pair of diametrically disposed inclined surfaces on one of said rotatable member and said rotary driven member;
and a pair of diametrically disposed rollers on the other of said rotary driven member and said rotatable member, each of said rollers cooperating with one of said inclined surfaces.

10. The clutch according to claim 9 in which said inclined surfaces are on said rotatable member and said rollers are on said rotary driven member.

11. The clutch according to claim 5 in which
said rotary driving member has at least one member slidably mounted thereon for axial movement relative to said rotary driving member and rotatable with said rotary driving member, said member has one surface forming said cooperating surface of said rotary driving member;
said rotary driven member having means mounted thereon for rotation therewith, said means has a surface forming said cooperating surface of said rotary driven member;
and said rotatable member engaging said slidably mounted member of said rotary driving means on the opposite side from said one surface when said rotatable member is moved axially relative to said driving and driven members.

12. The clutch according to claim 5 in which
said rotary driving member has a pair of disks mounted thereon for axial movement relative to said rotary driving member and rotatable with said rotary driving member;
said rotary driven member has a disk mounted thereon for axial movement relative to said rotary driven member and rotatable with said rotary driven member;
said rotary driven member has a portion fixedly secured thereto for rotation therewith;
said disk of said rotary driven member being disposed between said pair of disks of said rotary driving member and one of said pair of disks of said rotary driving member being disposed between said disk of said rotary driven member and said portion of said rotary driven member to form said cooperating surfaces of said driving and driven members;
and said rotatable member engaging said other of said pair of disks of said rotary driving member when said rotatable member is moved axially relative to said driving and driven members.

13. The clutch according to claim 5 in which
said rotary driving member has a member slidably mounted thereon and rotatable therewith, said member has a conical surface to form said cooperating surface of said rotary driving member;
said rotary driven member has a member fixedly secured thereto for rotation therewith, said member has a conical surface to form said cooperating surface of said rotary driven member;
and said rotatable member engaging said slidably mounted member of said rotary driving member on the opposite side from said conical surface when said rotatable member is moved axially relative to said driving and driven members.

14. The clutch according to claim 5 in which said cooperating cam surfaces include means to compensate for wear of said cooperating surfaces on said driving and driven members.

15. A clutch comprising:
a rotary driving member;
a rotary driven member;
means to couple said rotary driving member to said rotary driven member to cause said rotary driving member to rotate said rotary driven member;
a rotatable member, separate from said coupling means, mounted for axial movement relative to said driving and driven members to cause said coupling means to become operative;
means attached to said rotatable member and to said rotary driven member to urge said rotatable member to rotate relative to said rotary driven member;
and means to compensate for the wear of said coupling means.

References Cited
UNITED STATES PATENTS

| | | | |
|---|---|---|---|
| 2,061,787 | 11/1936 | Warner | 192—69 X |
| 2,069,132 | 1/1937 | Clark | 192—55 |
| 2,308,679 | 1/1943 | Eason | 192—24 X |
| 2,474,876 | 7/1949 | White | 192—24 |
| 3,176,811 | 4/1965 | Smith | 192—54 |
| 3,291,272 | 12/1966 | Fawick | 192—69 X |

BENJAMIN W. WYCHE III, *Primary Examiner.*

U.S. Cl. X.R.
192—24, 54, 70.2, 70.29